A. Tracy
Metal Shears.
Nº 2,181.   Patented Jul. 17, 1841.
Fig. 1.
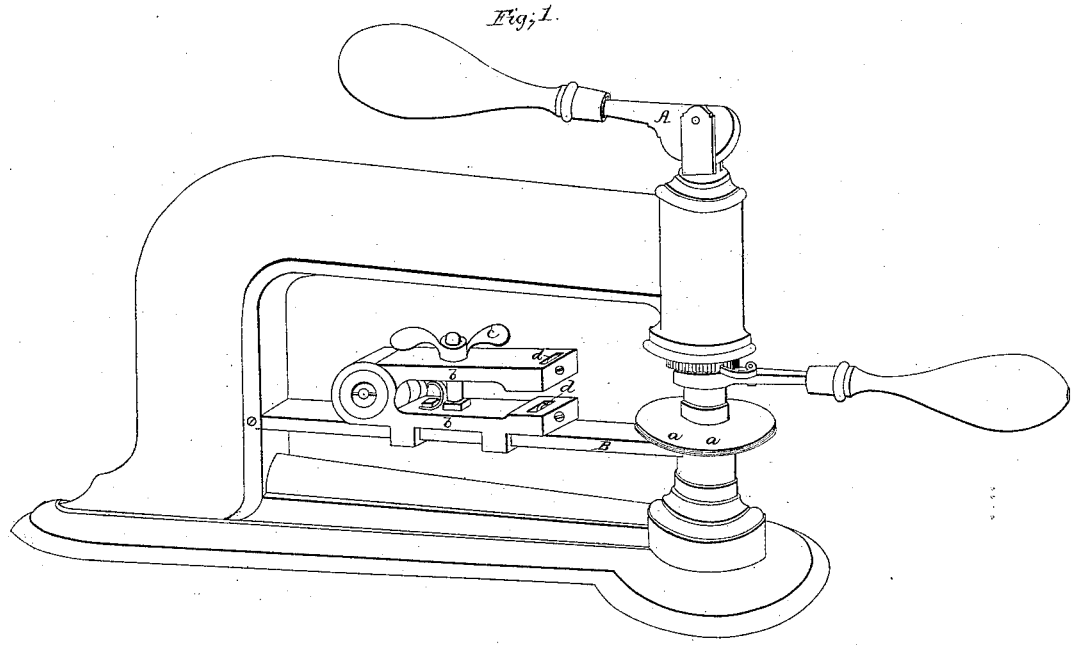
Fig. 4.   Fig. 3.   Fig. 2.
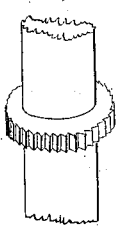 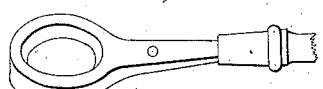
Fig. 5.
Fig. 6.
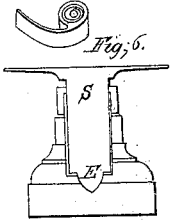 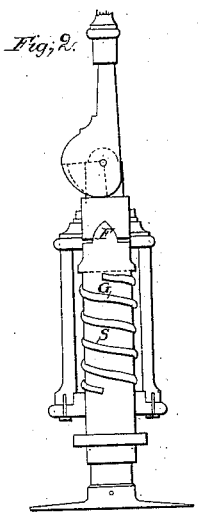

UNITED STATES PATENT OFFICE.

ANDREW TRACY, OF POUGHKEEPSIE, NEW YORK.

MACHINE FOR CUTTING SHEET METAL.

Specification of Letters Patent No. 2,181, dated July 17, 1841.

*To all whom it may concern:*

Be it known that I, ANDREW TRACY, of the village of Poughkeepsie, county of Dutchess, and State of New York, have invented a new and useful machine for cutting sheet tin, copper, brass, iron, or any sheet metal and glass, which machine I denominate "the rotary and graduating circular hing shears and press"; and I do hereby declare that the following is a full, clear, and exact description of the construction and operation of such machine, (reference being had to the annexed drawing making part of this specification,) in which—

Figure I is a perspective view of the entire machine;

Said press or machine being a cast iron frame with a screw or lever power worked by hand, (marked A, on the drawing,) which power on being applied brings the two circular holding plates marked $a$, $a$, together, thus securing the sheet of metal or glass, firmly for shearing;

To the upright cylindrical sections of the machine exhibited in detail and marked $s$, $s$, (Figs. 2, and 6,) the circular holding plates are fixed, and attached to the inferior of said cylindrical sections is a graduated rod or lever marked B, in which the shears marked $b$, $b$, are secured for operating, and by means of a thumb screw used for fastening the same on the said lever, made to cut the metal or glass at any given diameter.

Two distinct modes of operation in shearing or cutting the metal or glass are contemplated, viz: First, that the shears be moved round by hand, being fixed on the lever so as to cut the metal or glass at the required diameter, the holding plates, and metal or glass shut therein contained, being fixed and stationary. Second, the material to be cut being secured as above, the holding plates with the material therein, are made to revolve by the use of the lever and ratchet, represented in parts by Figs. 3, 4, and 5. The thumb screw of the shears marked C, being turned prior to each movement or operation, until the cutters marked $d$, $d$, are forced through the metal sheet, or into the glass, (a diamond or diamonds being employed in the cutting, or shearing of glass.) The first mode of operation is deemed most feasible when the material, (whether metal or glass,) to be cut or sheared is comparatively thin and light; the second mode of operation, may be preferable when the material is of a thick and stubborn texture. The upright cylindrical sections with the circular holding plates, their internal structure and movement are represented by figures marked 2 and 6: E is the lower, F, the upper center of said sections; G is the worm spring to raise the upper section in order to liberate the metal or glass from the holding plates after the shearing process.

The shears consist of two sections or parts united by a hinge at one end; at the other end of the shears are fixed the circular cutters marked $d$, $d$, which cutters when the shears is in operation revolve on screw pins, there being one of such pins in each jaw of the shears. The cutters being forced through the material to be sheared as above stated.

What I claim as my invention and desire to secure by Letters Patent, is—

1. Attaching the upper rotary shear, to a hinge piece, regulated by a thumb screw, for the purpose and in the manner specified.

2. Attaching the stock of the shears to a lever revolving around the center of the holding plates.

3. And the combination of the lever and ratchet, with the upper holding plate, for turning the metal or glass as herein described.

Dated Poughkeepsie July 3d 1841.

ANDREW TRACY.

Witnesses:
WM. WILKINSON,
JOSEPH C. HARRIS.